United States Patent [19]
Hokazono et al.

[11] Patent Number: 5,255,648
[45] Date of Patent: * Oct. 26, 1993

[54] INTAKE AIR CONTROL DEVICE FOR AN INTERNAL COMBUSTION ENGINE

[75] Inventors: Yuichi Hokazono; Toshiaki Konomi, both of Susono, Japan

[73] Assignee: Toyota Jidosha Kabushiki Kaisha, Aichi, Japan

[*] Notice: The portion of the term of this patent subsequent to Jan. 19, 2010 has been disclaimed.

[21] Appl. No.: 883,352

[22] Filed: May 15, 1992

[30] Foreign Application Priority Data

May 21, 1991 [JP] Japan .................. 3-116023
Jan. 22, 1992 [JP] Japan .................. 4-009371

[51] Int. Cl.⁵ ............................................. F02B 31/00
[52] U.S. Cl. ..................................... 123/308; 123/339; 123/52 MF
[58] Field of Search ............ 123/308, 339, 432, 52 MF

[56] References Cited

U.S. PATENT DOCUMENTS

| | | | |
|---|---|---|---|
| 4,519,363 | 5/1985 | Bernardoni et al. | 123/52 MF |
| 4,779,580 | 10/1988 | Rutschmann | 123/52 MF |
| 4,901,680 | 2/1990 | Matsumoto | 123/308 |
| 4,986,225 | 1/1991 | Wu et al. | 123/52 MF |
| 5,165,374 | 11/1992 | Chapman et al. | 123/308 |
| 5,179,917 | 1/1993 | Hokazono et al. | 123/52 MF |

FOREIGN PATENT DOCUMENTS

| | | |
|---|---|---|
| 0250753 | 1/1988 | European Pat. Off. . |
| 0268914 | 6/1988 | European Pat. Off. . |
| 58-152123 | 9/1983 | Japan . |
| 58-210322 | 12/1983 | Japan . |
| 59-135334 | 9/1984 | Japan . |
| 61-58634 | 4/1986 | Japan . |
| 61-74633 | 5/1986 | Japan . |

*Primary Examiner*—Willis R. Wolfe
*Assistant Examiner*—Erick Solis
*Attorney, Agent, or Firm*—Kenyon & Kenyon

[57] ABSTRACT

An intake air control device including a reed valve passage for supplying intake air via reed valves, and a sub intake passage for creating a swirl in the combustion chamber. The intake air control device further comprises a main intake passage for supplying intake air without passing same through the reed valves. A selection unit selects a passage through which the intake air is passed in response to a current engine driving condition, by selecting the sub intake passage when the current engine driving condition is a low engine speed and low engine load driving condition, selecting the reed valve passage when the current engine driving condition is a low engine speed and high engine load driving condition, and selecting the main intake passage when the current engine driving condition is a high engine speed driving condition.

20 Claims, 8 Drawing Sheets

|  | FIRST CONTROL VALVE | SECOND CONTROL VALVE |
|---|---|---|
| AREA I | FULLY CLOSED | FULLY CLOSED |
| AREA II₁ | PARTLY OPEN | FULLY OPEN |
| AREA II₂ | FULLY OPEN | FULLY OPEN |
| AREA II₃ | FULLY OPEN | FULLY CLOSED |
| AREA III | FULLY OPEN | FULLY OPEN |

INTAKE AIR CONTROL DEVICE FOR AN INTERNAL COMBUSTION ENGINE

BACKGROUND OF THE INVENTION

1. Field of the Invention

The present invention relates to an intake air control device for an internal combustion engine, the device comprising a reed valve passage for supplying intake air via reed valves, to thereby prevent a back flow of intake air, and a sub intake passage for creating a swirl in a combustion chamber.

2. Description of the Related Art

Japanese Unexamined Patent Publication No. 58-210322 discloses an intake air control device comprising a reed valve passage in which reed valves are arranged, and a sub intake passage, for creating a swirl in a combustion chamber, having a control valve and bypassing the reed valves.

In the above intake air control device, when in a low engine speed and low engine load driving condition, the sub intake passage is opened by the control valve so that all of the intake air is supplied to the combustion chamber and passes through the sub intake passage, whereby a good combustion can be obtained by the creating of a swirl in the combustion chamber. When in a low engine speed and high engine load driving condition, the sub intake passage is closed by the control valve so that all of the intake air passes through the reed valve passage and is supplied to the combustion chamber, whereby a back flow of intake air is prevented by the reed valves and the control valve and it is possible to obtain a higher torque, to thus increase the charging efficiency.

In a high engine speed driving condition, a large amount of intake air is required, and therefore in the above intake air control device, the intake air is supplied to and passes through the reed valve passage in this driving condition. The reed valves are relatively large and are arranged in a reed valve passage having a large cross section, but a considerable pressure loss is generated when the reed valves are fully open to allow a large amount of intake air to pass therethrough, and thus a desired torque cannot be obtained and a sufficient amount of intake air is not supplied to the combustion chamber, and accordingly, a considerable pressure loss occurs.

SUMMARY OF THE INVENTION

Therefore, an object of the present invention is to provide an intake air control device for an internal combustion engine, which device ensures that a sufficient amount of intake air is supplied during a high engine speed condition, and can maintain the same effect during a low engine speed condition.

According to the present invention there is provided an intake air control device comprising: a main intake passage leading to a combustion chamber and allowing an amount of intake air required in a high engine speed driving condition to pass therethrough; a reed valve passage leading to the combustion chamber and having reed valves for allowing a sufficient amount of intake air required in a low engine speed and high engine load driving condition to pass therethrough only from upstream to downstream thereof; a sub intake passage leading to the combustion chamber for creating a swirl therein; detection means for detecting a current engine driving condition, all of the detected engine driving conditions being divided into a low engine speed and low engine load driving condition, a low engine speed and high engine load driving condition and high engine speed driving condition, each corresponding to a required amount of intake air; and selection means for selecting a passage through which the intake air is passed in response to said current engine driving condition, by selecting the sub intake passage when the current engine driving condition is a low engine speed and low engine load driving condition, selecting the reed valve passage when the current engine driving condition is a low engine speed and high engine load driving condition, and selecting the main intake passage when the current engine driving condition is a high engine speed driving condition.

The present invention will be more fully understood from the description of preferred embodiments of the invention set forth below, together with the accompanying drawings.

DESCRIPTION OF THE PREFERRED EMBODIMENTS

Figure 1:
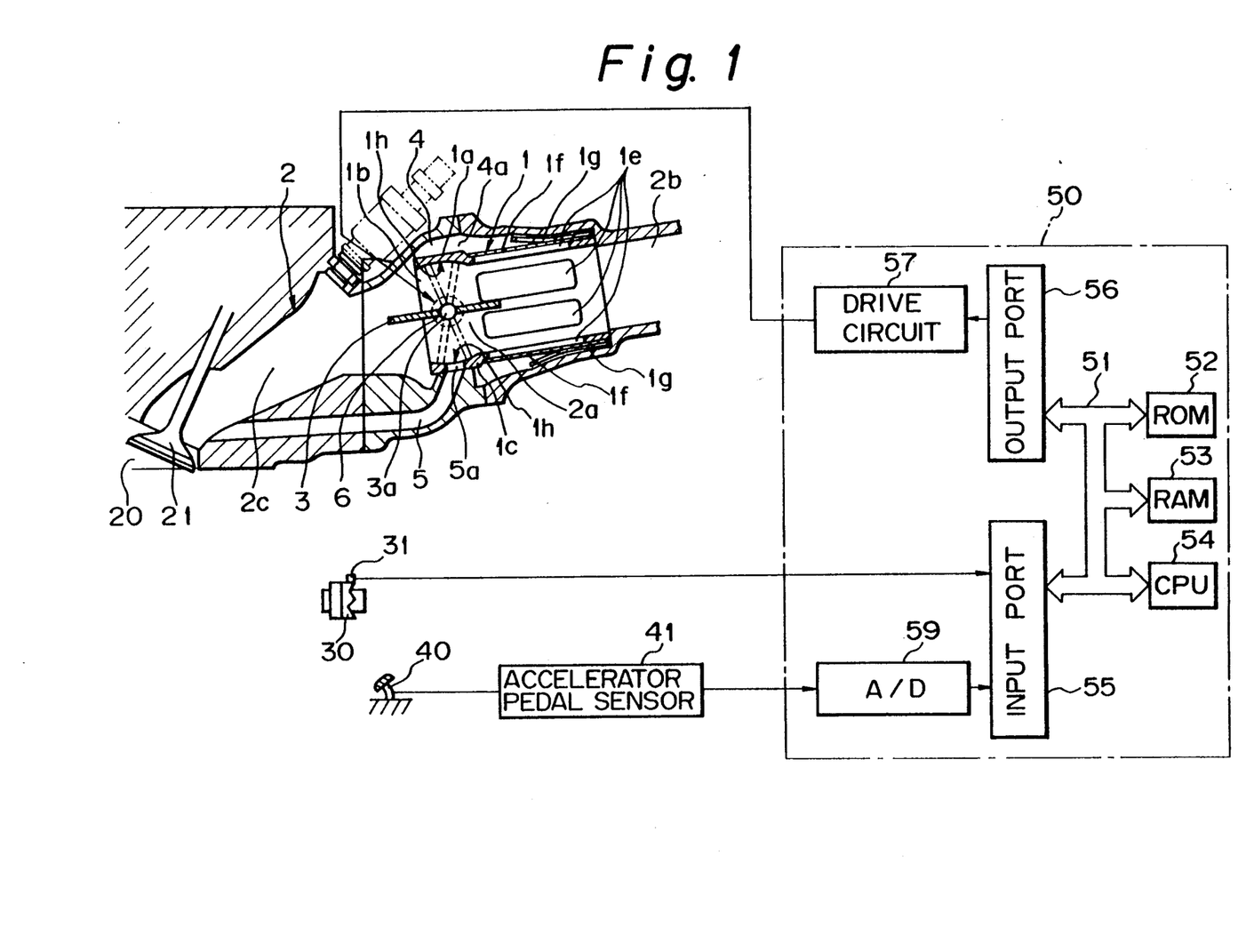
FIG. 1 is a schematic view of an intake air control device as a first embodiment of the present invention.

FIG. 1 shows a first embodiment of the present invention. In this figure, reference numeral 1 designates a reed valve assembly having four side walls 1a, 1b, 1c, 1d (only 1d is not shown), defining an inside space 2a wherein a control valve 3 pivoting on a shaft 3a is mounted. Each of the side walls 1a, 1b, 1c, 1d is provided with a pair of openings 1e extending in a longitudinal direction upstream of the control valve 3, and a pair of reed valves 1f and stoppers 1g thereof are mounted at the each of the side walls 1a, 1b, 1c, 1d to cover the openings 1e and opening only outward therefrom. All of these reed valves 1f can allow an amount of intake air required during a low engine speed and high engine load driving condition to pass therethrough, because a longitudinal length of the reed valve assembly 1 can be freely selected and the reed valves 1f can be relatively large.

A main intake passage 2 leading to a combustion chamber 20 via an intake valve 21 consists of the inside space 2a of the reed valve assembly 1, an upstream space 2b, and a downstream space 2c, and is formed so as to allow an amount of intake air required during a high engine speed driving condition to pass therethrough. A space 4a surrounding the reed valve assembly 1 called a reed valve passage 4 is communicated with the downstream space 2c, and intake air is passed therethrough via the reed valves 1f.

A sub intake passage 5 for creating a swirl in the combustion chamber 20 communicates the inside space 2a downstream of the reed valves 1f with the downstream space 2c, at a point close to the intake valve 21.

The control valve 3 closes the inside space 2c downstream of a opening 5a of the sub intake passage 5 formed in the lower side wall 1c, when in a first pivoted position as shown by a dotted line, and closes the inside space 2c upstream of the opening 5a when in a second pivoted position as shown by a chain line. The lower side wall 1c at a point close to the opening 5a and the upper side wall 1a at a point opposite to the opening 5a are provided with recess 1h, respectively, allowing the control valve 3 to be pivoted between the first pivoted position and the second pivoted position.

A step motor 6 for driving the control valve 3 is mounted outside of the main intake passage 2, and is controlled by the electronic control unit (ECU) 50.

The ECU 50 is constructed as a digital computer and includes a ROM (read only memory) 52, a RAM (random access memory) 53, a CPU (microprocessor, etc.) 54, an input port 55, and an output port 56. The ROM 52, the RAM 53, the CPU 54, the input port 55, and the output port 56 are interconnected by a bidirectional bus 51.

A distributor 30 is provided with a crank angle sensor 31 connected to the input port 55. An accelerator pedal sensor 41 for detecting a degree of opening of an accelerator pedal 40 is also connected to the input port 55, via an AD converter 59. The output port 56 is connected to the step motor 6 via a drive circuit 57.

Figure 2:
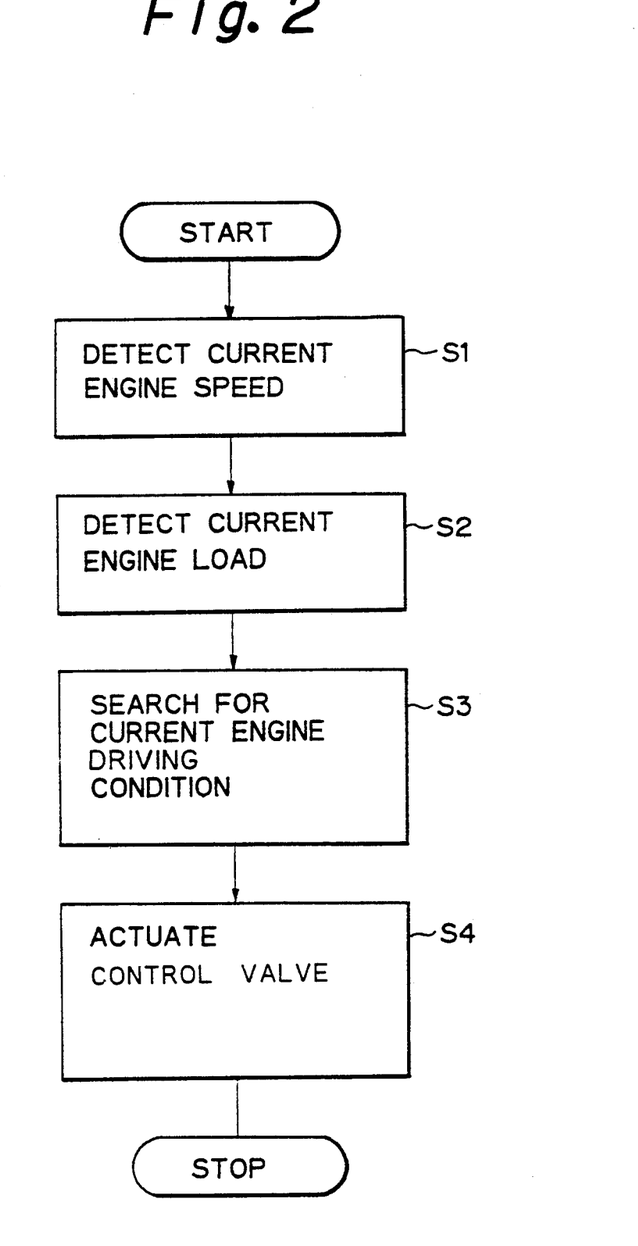
FIG. 2 is a flow chart of the routine carried out by an electronic control unit shown in FIG. 1.

The ECU 50 operates the control valve 3 according to a flow chart shown in FIG. 2.

At step S1, a current engine speed is detected on the basis of a signal from the crank angle sensor 31, and the routine goes to step S2.

At step S2, a current engine load is detected on the basis of a signal from the accelerator pedal sensor 41, and the routine goes to step S3.

At step S3, a search is made for a current engine driving condition, on the basis of the current engine speed and load, and the routine goes to step S4.

At step S4, the control valve 3 is actuated on the basis of the current engine driving condition.

Figure 3:
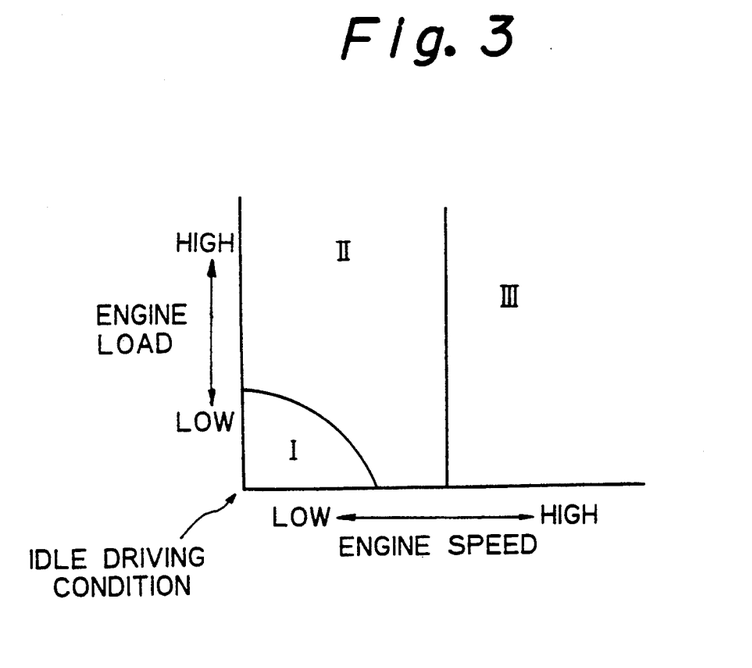
FIG. 3 is a first engine speed-load map for determining a current engine driving condition.

The search at step S3 is carried out by using a first engine speed-load map shown in FIG. 3, in which all of the engine driving conditions are divided into three driving conditions I, II, and III corresponding to a required amount of intake air. The actuating at step S4 is carried out as follows.

When in the low engine speed and low engine load driving condition I, which includes an idling condition, the control valve 3 is pivoted by the step motor 6 to the first pivoted position (shown by the dotted line), whereby the control valve 3 serves as first closing means for closing the main intake passage 2 consisting of the inside space 2a of the reed valve assembly 1, the upstream space 2b and the downstream space 2c, between a branched point (the opening 5a) of the sub intake passage 5 and a merging point (an opening of the sub intake passage 5 leading to the downstream space 2c) Accordingly, almost the entire amount of intake air passes through the sub intake passage 5, and thus a good combustion can be obtained by a swirl created thereby in the combustion chamber 20.

When in the low engine speed and high engine load driving condition II, the control valve 3 is pivoted by the step motor 6 to the second pivoted position (shown by the chain line), whereby the control valve 3 serves as second closing means for closing the main intake passage 2, between a branched point (the opening 1e in each of the side walls 1a, 1b, 1c, 1d of the reed valve assembly 1) of the reed valve passage 4 and a merging point (an opening of the passage 4 leading to the downstream space 2c), and upstream of the branched point of the sub intake passage 5. Accordingly, the entire amount of intake air passes, via the reed valves 1f, from the space 4a surrounding the reed valve assembly 1 to the downstream space 2c and is supplied to the combustion chamber 20, whereby a back flow of intake air is prevented by the control valve 3 and the reed valves 1f, and accordingly, the charging efficiency is increased and a higher torque is obtained.

When in the high engine speed driving condition III the control valve 3 is pivoted by the step motor 6 to a third pivoted position as shown by the solid line, to open the main intake passage 2. Accordingly, a large amount of intake air required in this driving condition passes through the main intake passage 2 and is supplied to the combustion chamber 20, without passing through the reed valves 1f, to thereby ensure a sufficient supply thereof, and avoid a drop in the torque.

In the first embodiment, the manufacturing costs thereof can be reduced because the single control valve 3 serves as both the first and the second closing means.

Figure 4A:
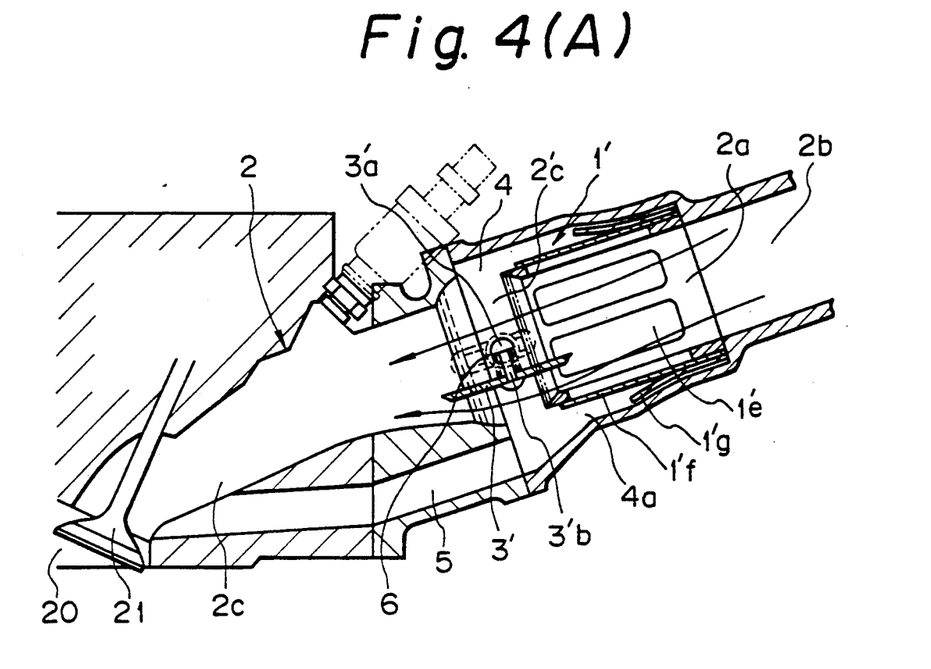
FIG. 4(A) is a schematic view of an intake air control device as a second embodiment of the present invention.

FIG. 4(A) shows a second embodiment; here only the difference between the first and second embodiments is explained, as follows.

A reed valve assembly 1' is formed such that the control valve 3 and portions of each side walls 1a, 1b, 1c, 1d surrounding the valve 3 from the reed valve assembly 1 in the first embodiment are omitted. A space 4a surrounding the reed valve assembly 1' communicates a sub intake passage 5 via a portion 2'c of the downstream space 2c close to an inside space 2a of the reed valve assembly 1'.

Figure 4B:
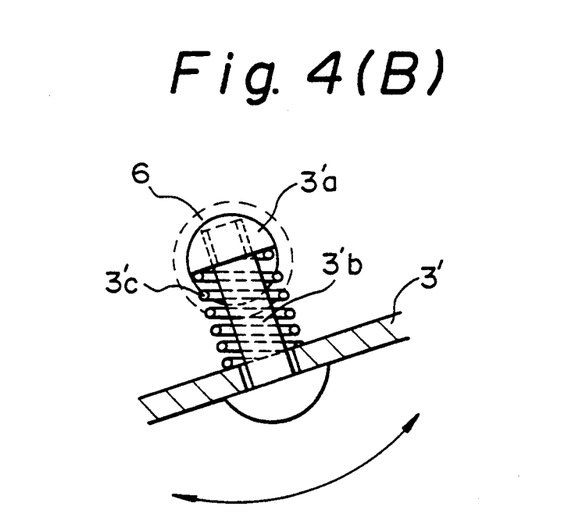
FIG. 4(B) is an enlarged view of a control valve shown in FIG. 4(A)

FIG. 4(B) shows an enlarged view of a control valve 3'. As shown in the figure, reference numeral 3'a designates a pivoting shaft arranged in the portion 2'c of the downstream space 2c. The control valve 3' is slidable mounted on a shaft of a bolt 3'b having a head and fixed in the pivoting shaft 3'a, and is biased toward the head by a spring 3'c inserted in the shaft of the bolt 3'b. The control valve 3' is movable toward the pivoting shaft 3'a against the spring 3'c, and is driven together with the pivoting shaft 3'a by a step motor 6 controlled by an ECU (not shown), such as the ECU 50 in the first embodiment, and can be pivoted between a first pivoted position as shown by the dotted line and a second pivoted position as shown by the chain line.

When in the low engine speed and low engine load driving condition I, which includes an idling condition, the control valve 3' is pivoted by the step motor 6 to the first pivoted position (shown by the dotted line), whereby the control valve 3' serves as third closing means for closing the main intake passage 2 consisting of the inside space 2a of the reed valve assembly 1', the upstream space 2b and the downstream space 2c containing the portion 2'c, between the branched point and the merging point of the sub intake passage 5, and downstream of the merging point of the reed valve passage 4. When in the low engine speed and high engine load driving condition II, the control valve 3' is pivoted by the step motor 6 to the second pivoted position (shown by the chain line), whereby the control valve 3 serves as the second closing means for closing the main intake passage 2, between the branched point and the merging point of the reed valve passage 4, and upstream of the branched point of the sub intake passage 5. When in the high engine speed driving condition III, the control valve 3' is pivoted by the step motor 6 to a third pivoted position as shown by the solid line, to thereby open the main intake passage 2. Accordingly, the second embodiment can obtain the same effects as the first embodiment.

Note, in the first embodiment, if a degree of stiffness of the reed valves $1f$ is too low, a part of intake air in the low engine speed and low engine load driving condition I is supplied via the reed valves $1f$ without passing through the sub intake passage 5, whereby the intended swirl becomes weak, and if the degree of stiffness is too high, the reed valves $1f$ provide a considerable resistance to intake air in the low engine speed and high engine load driving condition II, whereby the required amount of intake air cannot be supplied to the combustion chamber 20. Accordingly, the degree of stiffness of the reed valves $1f$ must be very carefully selected.

Nevertheless, according to the second embodiment, in the low engine speed and low engine load driving condition, all of the intake air, containing a part of intake air passed via the reed valves $1'f$, passes only through the sub intake passage 5 and is supplied to the combustion chamber 20, due to the closing of the main intake passage 2 downstream of the merging point of the reed valve passage 4, and accordingly, the degree of stiffness of the reed valves $1'f$ may be relatively low, and thus the selection of the reed valves $1'f$ is simplified.

Figure 5:
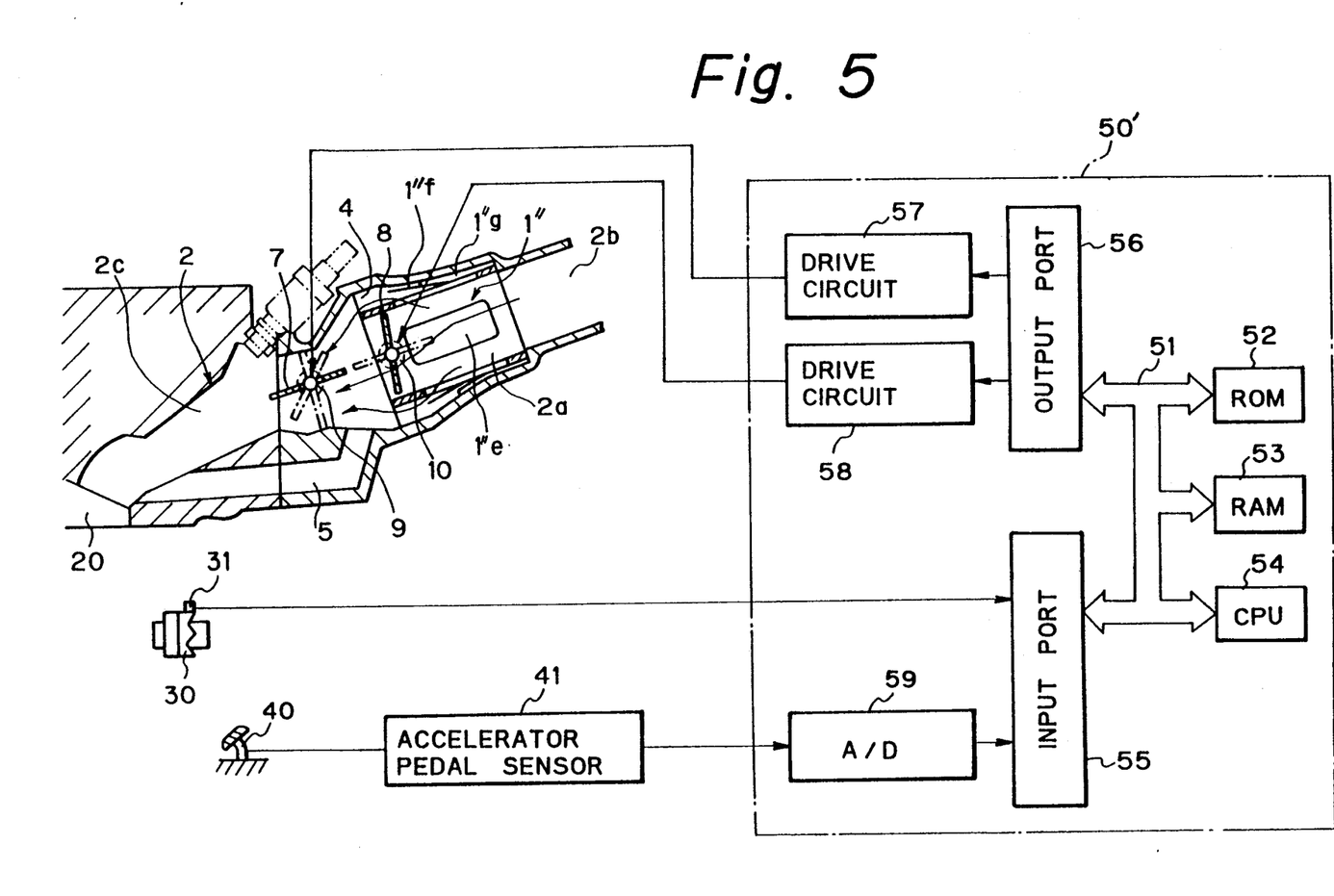
FIG. 5 is a schematic view of an intake air control device as a third embodiment of the present invention.

FIG. 5 shows a third embodiment; here only the difference between the third and second embodiments is explained, as follows.

The intake air control device of the third embodiment comprises first and second control valves 7 and 8, and two step motors 9 and 10 for driving the valves 7 and 8, respectively. These step motors 9 and 10 are connected to an output port 56 of an ECU 50' via corresponding drive circuits 57 and 58, and are controlled by the ECU 50'. The first control valve 7 closes the main intake passage 2 in the first pivoted position of the control valve 3' used in the second embodiment, and the second control valve 8 closes the main intake passage 2 in the second pivoted position of the control valve 3'. Accordingly, the first control valve 7 serves as the third closing means explained in the second embodiment, and the second control valve 8 serves as the second closing means explained in the second embodiment, whereby the third embodiment can obtain the same effects as the second embodiment.

Note, in the low engine speed and low engine load driving condition I which includes an idling condition, if a back flow of exhaust gases occurs, by which the intake and exhaust valves are opened simultaneously at the end of exhaust stroke, the combustion becomes unstable.

According to the third embodiment, when in this driving condition I, the first control valve 7 closes the main intake passage 2 between the branched point and the merging point of the sub intake passage 5, and downstream of the merging point of the reed valve passage 4, as the third closing means, and at the same time the second control valve 8 closes the main intake passage 2 between the branched point and the merging point of the reed valve passage 4, and upstream of the branched point of the sub intake passage 5, as a fourth closing means, whereby all of the intake air passes from the passage 4, via the reed valves $1''f$, to the sub intake passage 5 and is supplied to the combustion chamber 20, so that a more stable combustion can be obtained by the creating of a swirl, and further, to prevent a back flow of exhaust gases by the reed valves $1''f$ and the second control valve 8.

Figure 6A:
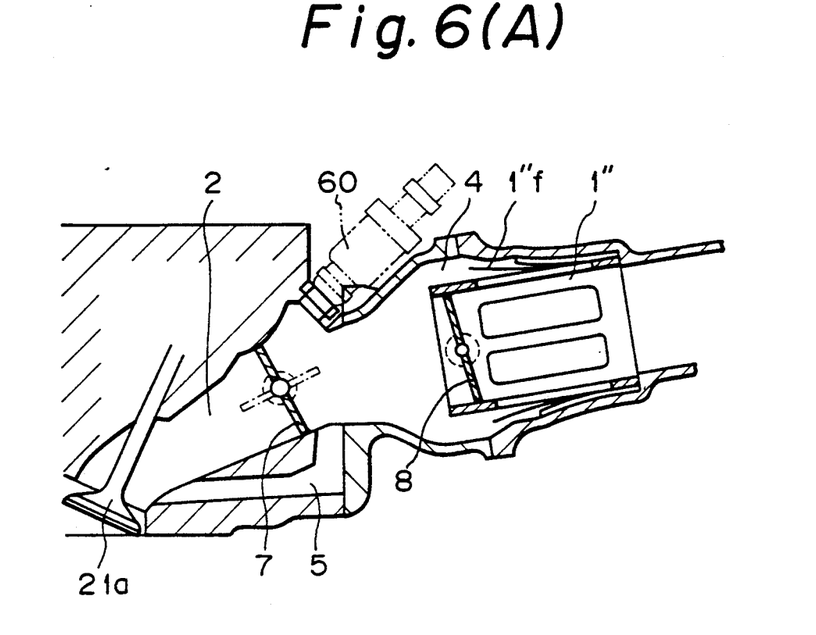
FIG. 6(A) shows a modification of the third embodiment of FIG. 5.
Figure 6B:
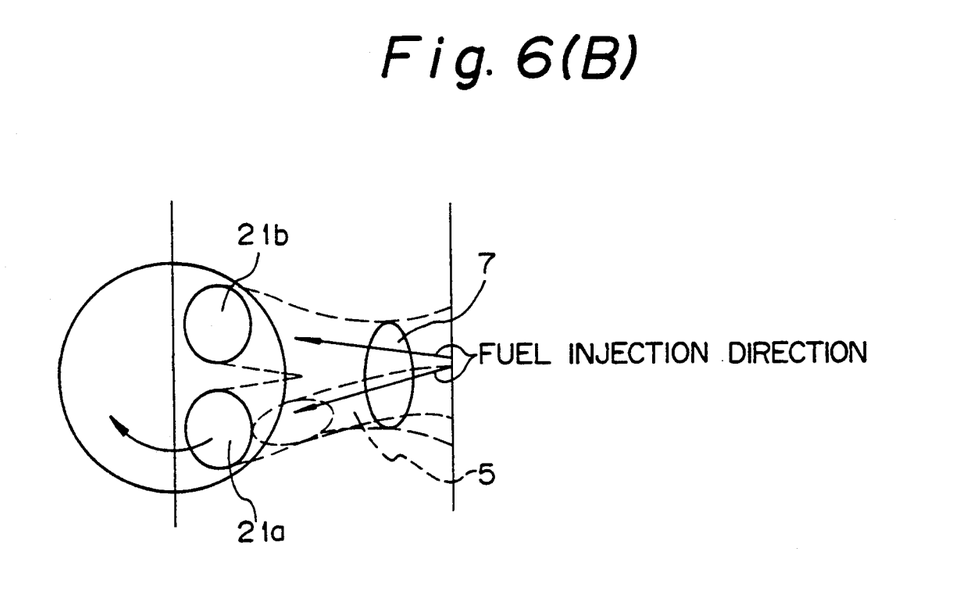
FIG. 6(B) is a bottom view of FIG. 6(A)

FIGS. 6(A) and 6(B) show a modification of the third embodiment, when an intake air control device is used in a engine having two intake valves. As shown in FIG. 6(B), a main intake passage 2 is divided into two passages downstream of the first control valve 7, and intake air is fed to the combustion chamber 20 via two intake valves 21a and 21b. A sub intake passage 5 leads to the main intake passage 2 at a point close to the intake valve 21a.

A fuel injector 60 has two injection holes for injecting fuel toward the two intake valves 21a and 22a, respectively, and accordingly, the amount of fuel to be injected can be divided into two, and thus an atomization thereof can be accelerated when the fuel collides with the back side of the intake valves 21a and 21b.

If the injector 60 is arranged downstream of the first control valve 7, as shown in the third embodiment, a desired ratio of the air-fuel mixture in the combustion chamber 20 cannot be obtained in the low engine speed and low engine load driving condition, because the intake air in this driving condition passes only through the sub intake passage 5 and is supplied only via the intake valve 21a and there is less intake air flowing to the combustion chamber 20 via the other intake valve 21b, and thus an amount of fuel injected toward the another intake valve 21b is atomized but this atomized fuel does not easily flow in the combustion chamber 20.

In this modification, the injector 60 is arranged between the first control valve 7 and second control valve 8, and accordingly, the fuel injected under driving conditions other than the low engine speed and low engine load driving condition I is atomized by an impact thereof with the two intake valves 21a and 21b, respectively, and flows in the combustion chamber 20 together with the intake air, and the fuel in the low engine speed and low engine load driving condition I is atomized and collides with the first control valve 7, which is closed in this driving condition, and becomes a mixture having a desired air/fuel ratio before the intake air passes through the sub intake passage 5. Accordingly, a desired ratio of the mixture can be always obtained in the low engine speed and low engine load driving condition I.

Figure 7A:
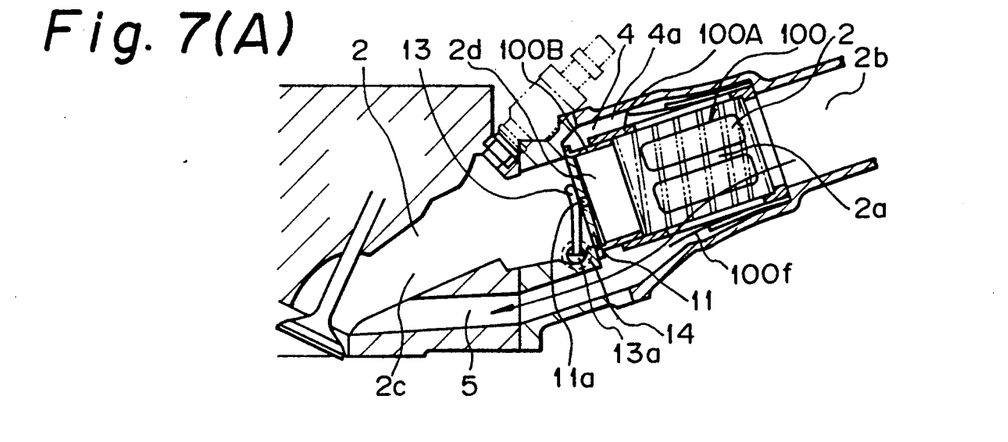
FIG. 7(A) is a schematic view of an intake air control device as a fourth embodiment of the present invention, for a low engine speed and low engine load driving condition.
Figure 7B:
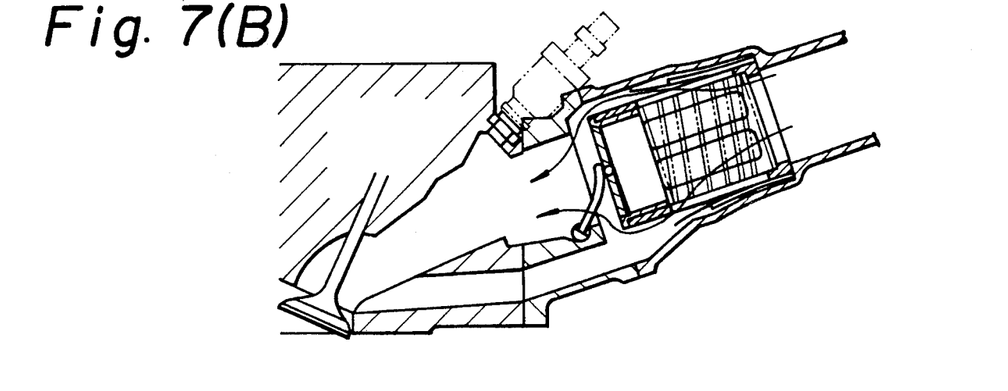
FIG. 7(B) is a schematic view similar to that of FIG. 7(A), for a low engine speed and high engine load driving condition.
Figure 7C:
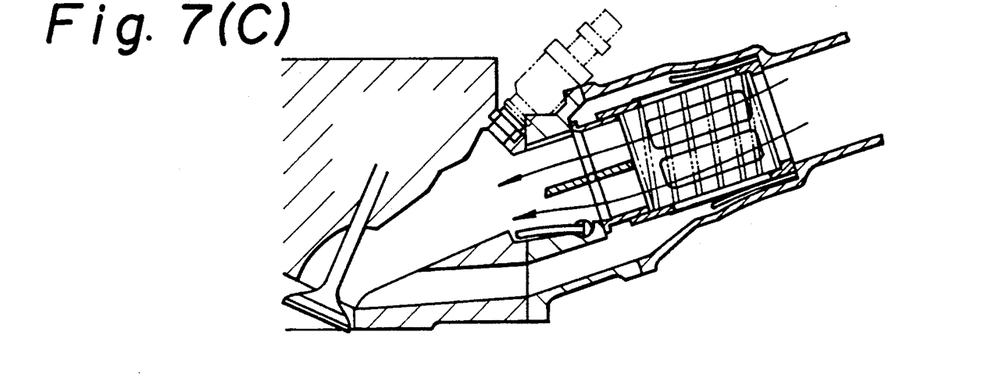
FIG. 7(C) is a schematic view similar to that of FIG. 7(A), for a high engine speed driving condition.

FIG. 7 shows a fourth embodiment; here only the difference between the fourth and second embodiments is explained, as follows.

A reed valve assembly 100 consists of an outside member 100A similar to the reed valve assembly 1' in the second embodiment and an inside member 100B joined telescopically to the outside member 100A. A control valve 11 is arranged at a part farthest downstream of an inside space 2d of the inside member 100B biased toward a downstream direction by a spring 12 with respect to the outside member 100A. The control valve 11 can pivot about a shaft 11a freely only in a anticlockwise direction in FIG. 7(A), and thus is suitably chamfered.

A arm 13 mounted at a drive shaft 13a is arranged downstream of the control valve 11, and an end of the arm 13 bears against the control valve 11 at a point higher than the drive shaft 13a on FIG. 7(A). The drive shaft 13a is connected to a step motor 14 controlled by a ECU (not shown), such as the ECU 100 of the first embodiment.

In the fourth embodiment, in the low engine speed and low engine load driving condition I, which includes the idling condition, the arm 13 is pivoted to a first pivoted position as shown in FIG. 6(A), and accordingly the control valve 11 serves as sixth closing means for closing the main intake passage 2 consisting of the inside spaces 2a and 2d of the reed valve assembly 100, the upstream space 2b and the downstream space 2c, between the branched point of the reed valve passage 4 and the merging point of the sub intake passage 5, and at the same time, the inside member 100B serves as fifth closing means for blocking the merging point of the reed valve passage 4 and the branched point of the sub intake passage 5 from the main intake passage 2 under a condition in which the reed valve passage 4 is communicated with the sub intake passage 5. Accordingly, all of the intake air passes from the reed valve passage 4, via the reed valves 100f, to the sub intake passage 5 and is supplied to the combustion chamber 20, and thus the same effects as in the third embodiment can be obtained.

In the low engine speed and high engine load driving condition II, the arm 13 is pivoted in a clockwise direction to a second pivoted position, as shown in FIG. 7(B), so that the control valve 11 still closes the inside space 2d and the inside member 100B is slid in a upstream direction against the spring 12, and accordingly the merging point of the reed valve passage 4 is communicated with the downstream space 2c of the main intake passage 2.

At this time, the control valve 11 serves as the second closing means explained in the first embodiment, so that intake air is passed, via the reed valves 100f, through the main intake passage 2 and is supplied to the combustion chamber 20, whereby a higher torque can be obtained to thus increase the charging efficiency, as in the abovementioned embodiments.

In the high speed driving condition, the arm 13 is pivoted in a anti-clockwise direction to a third pivoted position, as shown in FIG. 7(C), so that the end of the arm 13 is separated from the control valve 11, and accordingly, the control valve 11 is opened by the force of the intake air, and thus the main intake passage 2 is opened and the intake air passes therethrough, to thereby ensure a sufficient supply thereof as in the above embodiments.

Thus, the fourth embodiment can obtain the same effects as those of the third embodiment, and the manufacturing costs thereof can be reduced because only the step motor 14 for driving the arm 13 is used, in contrast to the third embodiment used the two step motors 9 and 10.

Figure 8:
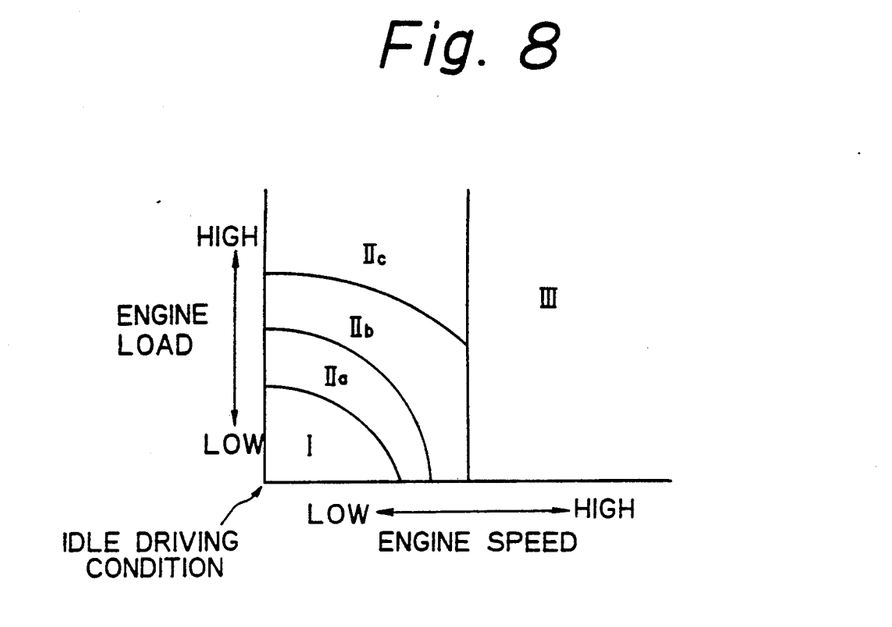
FIG. 8 is a second engine speed-load map for determining a current engine driving condition.
Figure 9:
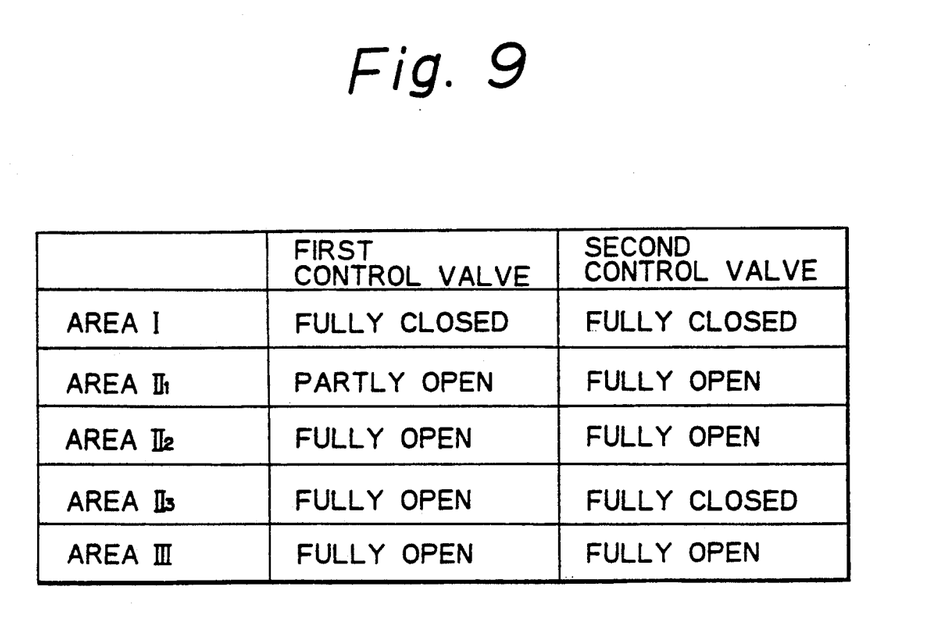
FIG. 9 is a table showing the opened or closed conditions of the first and second control valves in the third embodiment of FIG. 5, with respect to an engine driving condition in FIG. 8.

Next, in the third embodiment, a case in which the search at step S3 of the flow chart shown in FIG. 2 is carried out by using a second engine speed-load map as shown in FIG. 8, and then the actuating at step S4 is carried out in accordance with a table shown in FIG. 8, is explained. In this map, the low engine speed and high engine load driving condition II in the first map shown in FIG. 3 is divided into low engine speed and middle engine load driving conditions IIa, IIb, and low engine speed and high engine load driving condition IIc corresponding to a required amount of intake air.

Note, when the reed valves 1''f prevent a back flow of the intake air, a piston must exert a greater compression force, until the intake valve 21 is closed, from a bottom dead center of a compressing stroke thereof. This greater compressing force is increased when the timing of the intake valve 21 is retarded.

When in the low engine speed and middle engine load driving condition IIa, IIb, even if a back flow of the exhaust gases occurs, the combustion remains relatively stable and a higher torque is not required.

Accordingly, at step S4, the first and second control valve 6 and 7 are opened in these driving conditions similar to the high engine speed driving condition III, to thereby reduce the fuel consumption because the greater compression force by the piston is not required.

In the other driving conditions I, IIc, III, the first and second control valves 6 and 7 are in the same open or closed condition as mentioned above.

Further, when in the low engine speed and middle engine load driving condition IIa, in which a relatively small amount of intake air is required, the first control valve 6 is partly opened, corresponding to the required amount of intake air, and the second control valve 7 is fully opened so that a part of the required amount of intake air passes through the main intake passage 2 and the remainder of the required amount of intake air passes through the sub intake passage 5.

Accordingly, a swirl is also created in the combustion chamber 20 at this time, whereby the fuel consumption is reduced and a good combustion is obtained, due to the swirl.

In all of the above embodiments, that the main intake passage 2 can be opened in the low engine speed and middle engine load driving condition IIa, IIb, as in the high engine speed driving condition III, whereby the fuel consumption at this time can be reduced.

In the first embodiment, the control valve 3 can be pivoted in a clockwise direction, corresponding to the required amount of intake air, from the first pivoted position, and in the second embodiment, the control valve 3' can be pivoted in an anti-clockwise direction, corresponding to the required amount of intake air, from the first pivoting position.

Accordingly, in the first and second embodiments, the main intake passage 2 can be partly opened downstream of the branched point of the sub intake passage 5 and fully opened upstream of the control valve 3 or 3', in the low engine speed and middle engine load driving condition IIa in which a relatively small amount of intake air is required, whereby the fuel consumption at this time can be reduced and a good combustion can be obtained due to the swirl.

According to the present invention, in the low engine speed and low engine load driving condition, a stable combustion is obtained as usual, and in the low engine speed and high engine load condition, the charging efficiency is increased to allow the required amount of intake air to be supplied via the reed valves to thereby obtain a higher torque as usual, and in the high engine speed driving condition, a large required amount of intake air can be supplied through the main intake passage 2 without passing through the reed valves, to ensure a sufficient supply thereof.

Further, in the low engine speed and middle engine load driving condition, the intake air is supplied without passing through the reed valves, and accordingly, the fuel consumption at this time is reduced because the greater compressing force of the piston is not required.

Furthermore, when the required amount of intake air is relatively small in the low engine speed and middle engine load driving condition, a swirl can be created in the combustion chamber, and accordingly, a good combustion can be obtained at this time.

Although the invention has been described with reference to specific embodiments thereof, it should be apparent that numerous modifications can be made thereto by those skilled in the art, without departing from the basic concept and scope of the invention.

We claim:

1. An intake air control device for an internal combustion engine comprising:
   a main intake passage leading to a combustion chamber and allowing an amount of intake air required in a high engine speed driving condition to pass therethrough;
   a reed valve passage leading to said combustion chamber and having reed valves for allowing a sufficient amount of intake air required in a low engine speed and high engine load driving condition to pass therethrough only from upstream to downstream thereof;
   a sub intake passage leading to said combustion chamber for creating a swirl therein;
   detection means for detecting a current engine driving condition, all of the detected engine driving conditions being divided into a low engine speed and low engine load driving condition, a low engine speed and high engine load driving condition and a high engine speed driving condition, each corresponding to a required amount of intake air; and
   selection means for selecting a passage through which the intake air is passed in response to said current engine driving condition, by selecting said sub intake passage when the current engine driving condition is a low engine speed and low engine load driving condition, selecting said reed valve passage when the current engine driving condition is a low engine speed and high engine load driving condition, and selecting said main intake passage when the current engine driving condition is a high engine speed driving condition.

2. An intake air control device according to claim 1, wherein said reed valve passage has a branched point and a merging point downstream of said branched point in said main intake passage, said sub intake passage has a branched point and a merging point downstream of said branched point in said main intake passage, said branched point of said sub intake passage being downstream of said branched point of said reed valve passage, and said selection means comprises:
   first closing means for closing said main intake passage between said branched point and said merging point of said sub intake passage when the current engine driving condition is a low engine speed and low engine load driving condition;
   second closing means for closing said main intake passage between said branched point and said merging point of said reed valve passage, and upstream of said branched point of said sub intake passage, when the current engine driving condition is a low engine speed and high engine load driving condition; and
   opening means for opening said main intake passage when the current engine driving condition is a high engine speed driving condition.

3. An intake air control device according to claim 2, wherein said reed valves have a degree of stiffness such that a flow of intake air in the low engine speed and low engine load driving condition can be blocked.

4. An intake air control device according to claim 2, wherein said merging point of said sub intake passage is downstream of said merging point of said reed valve passage, and said selection means comprises third closing means for closing said main intake passage between said branched point and said merging point of said sub intake passage, and downstream of said merging point of said reed valve passage, when the current engine driving condition is a low engine speed and low engine load driving condition, instead of said first closing means.

5. An intake air control device according to claim 4, wherein said selection means further comprises fourth closing means for closing said main intake passage between said branched point and said merging point of said reed valve passage, and upstream of said branched point of said sub intake passage, when the current engine driving condition is a low engine speed and low engine load driving condition.

6. An intake air control device according to claim 4, wherein said reed valve passage is communicated with said sub intake passage, said selection means comprises fifth closing means for blocking said merging point of said reed valve passage and said branched point of said sub intake passage from said main intake passage when the current engine driving condition is a low engine speed and low engine load driving condition, and sixth closing means for closing said main intake passage between said branched point of said reed valve passage and said merging point of said sub intake passage, at the same time, instead of said third closing means.

7. An intake air control device according to claim 1, wherein said low engine speed and high engine load driving condition is divided into a low engine speed and middle engine load driving condition and a low engine speed and high engine load driving condition, each corresponding to a required amount of intake air, said selection means selecting said main intake passage when the current engine driving condition is a low engine speed and middle engine load driving condition.

8. An intake air control device according to claim 2, wherein said low engine speed and high engine load driving condition is divided into a low engine speed and middle engine load driving condition and a low engine speed and high engine load driving condition, each corresponding to a required amount of intake air, said opening means also opening said main intake passage when the current engine driving condition is a low engine speed and middle engine load driving condition.

9. An intake air control device according to claim 2, wherein said low engine speed and high engine load driving condition is divided into a low engine speed and middle engine load driving condition and a low engine speed and high engine load driving condition, each corresponding to a required amount of intake air, said first closing means is partly opened in accordance with a required amount of intake air, and the other closing means is fully opened regardless of said required amount of intake air, when the required amount of intake air is relative small in said low engine speed and middle engine load driving condition.

10. An intake air control device according to claim 4, wherein said low engine speed and high engine load driving condition is divided into a low engine speed and middle engine load driving condition and a low engine speed and high engine load driving condition, each corresponding to a required amount of intake air, said third closing means is partly opened in accordance with a required amount of intake air, and the other closing means is fully opened regardless of said required amount of intake air, when the required amount of intake air is relative small in said low engine speed and middle engine load driving condition.

11. An intake air control device according to claim 2, further including a reed valve assembly having a body formed in the shape of a hollow polygonal column, said reed valves being mounted, respectively, at side walls of said body to cover each opening in said walls and allow intake air to flow only in a downstream direction, said main intake passage consisting of an inside space of said reed valve assembly, an upstream space and a downstream space, said reed valve passage consisting of a space surrounding said reed valve assembly, said branched point of said sub intake passage being formed in one of said side walls downstream of said reed valves, a control valve being mounted at said inside space of said reed valve assembly downstream of said reed valves, said control valve serving as said first closing means in a first pivoted position, as said second closing means in a second pivoted position, and as said opening means in a third pivoted position.

12. An intake air control device according to claim 4, further including a reed valve assembly having a body formed in the shape of a hollow polygonal column, said reed valves being mounted, respectively, at side walls of said body to cover each opening in said walls and allow intake air to flow only in a downstream direction, said main intake passage consisting of an inside space of said reed valve assembly, an upstream space and a downstream space, said reed valve passage consisting of a space surrounding said reed valve assembly, said branched point of said sub intake passage being formed in a portion of said downstream space close to said inside space of said reed valve assembly, a control valve being slidably mounted on a shaft projecting in radial direction from a pivoting shaft provided in said portion of said downstream space, said control valve serving as said third closing means in a first pivoted position, as said second closing means in a second pivoted position, and as said opening means in a third pivoted position.

13. An intake air control device according to claim 5, further including a reed valve assembly having a body formed in the shape of a hollow polygonal column, said reed valves being mounted, respectively, at side walls of said body to cover each opening of said walls and allow intake air to flow only in a downstream direction, said main intake passage consisting of an inside space of said reed valve assembly, an upstream space and a downstream space, said reed valve passage consisting of a space surrounding said reed valve assembly, said branched point of said sub intake passage being formed in a portion of said downstream space close to said inside space of said reed valve assembly, a first control valve being mounted in said downstream space between said branched point and said merging point of said sub intake passage, and downstream of said merging point of said reed valve passage, a second control valve being mounted in said inside space downstream of said reed valves, said first control valve serving as said third closing means, and said second control valve serving as said second closing means and as said fourth closing means.

14. An intake air control device according to claim 6, further including a reed valve assembly having a body formed in the shape of a hollow polygonal column, said reed valves being mounted, respectively, at side walls of said body to cover each opening in said walls and allow intake air to flow only in a downstream direction, said main intake passage consisting of an inside space of said reed valve assembly, an upstream space and a downstream space, said reed valve passage consisting of a space surrounding said reed valve assembly, a downstream portion of said reed valve assembly being slidable in a longitudinal direction to block said branched point of said sub intake passage and said merging point of said reed valve passage from said main intake passage in a downstream position, so that said downstream portion serves as said fifth closing means, an inside space of said downstream portion having a control valve serving as said sixth closing means.

15. An intake air control device according to claim 14, wherein said control valve is freely pivotable only in a direction of one side thereof, a pivoting arm being arranged in said downstream space, said downstream portion being biased in a downstream direction by a spring, said arm being in contact with said control valve and holding said control valve so that said inside space of said downstream portion is closed in a first pivoted position, and actuating said downstream portion while said control valve is in the same closing condition in a upstream direction against said spring to a second pivoted position, and separating from said control valve in a third pivoted position so that said control valve is opened by a force of an intake air.

16. An intake air control device according to claim 13, wherein said downstream space of said main intake passage is divided into two passages downstream of said first control valve, which passages lead to said combustion chamber via two intake valves, said sub intake passage leading to said downstream space at a point close to one side of said two intake valves, a fuel injector with two injection holes being arranged between said first and second control valves.

17. An intake air control device according to claim 11, wherein said body of said reed valve assembly is formed in the shape of a hollow square column.

18. An intake air control device according to claim 12, wherein said body of said reed valve assembly is formed in the shape of a hollow square column.

19. An intake air control device according to claim 13, wherein said body of said reed valve assembly is formed in the shape of a hollow square column.

20. An intake air control device according to claim 14, wherein said body of said reed valve assembly is formed in the shape of a hollow square column.

* * * * *